United States Patent

[11] 3,582,875

| [72] | Inventors | Stanley Herbert Van Wambeck;<br>Frank Fisher Reynolds, both of Houston, Tex.; Stanley Herbert Van Wambeck, 44 Stillforest; Frank Fisher Reynolds, Jr., 2306 Peckham, both of Houston, Tex. |
|---|---|---|
| [21] | Appl. No. | 774,890 |
| [22] | Filed | Nov. 12, 1968 |
| [45] | Patented | June 1, 1971 |

[54] GEOPHONE DEVICE
9 Claims, 4 Drawing Figs.

| [52] | U.S. Cl. | 340/17 |
|---|---|---|
| [51] | Int. Cl. | G01v 1/16 |
| [50] | Field of Search | 340/17 |

[56] References Cited
UNITED STATES PATENTS

| 2,348,225 | 5/1944 | Petty | 340/17 |
| 2,751,573 | 6/1956 | Millington | 340/17 |
| 3,018,467 | 1/1962 | Harris | 340/17X |
| 3,242,459 | 3/1966 | McCollum | 340/17 |
| 3,451,040 | 6/1969 | Johnson | 340/17 |

Primary Examiner—Rodney D. Bennett, Jr.
Assistant Examiner—Brian L. Ribando
Attorney—Bernard A. Reiter ABSTRACT: An improved seismometer or "geophone" for detecting and measuring subsurface geophysical reflections. The device comprises an outer housing having fixedly disposed therein a central magnet. Disposed about the magnet is circular manner are coil windings. The windings are supported at each end of the magnet and within the housing by cantilever mounted leaf springs, one of the leaf springs being prestressed in tension while the other is prestressed in compression so as to provide a sensitive, freely mounted coil about the magnet.

PATENTED JUN 1 1971 3,582,875

S. H. VAN WAMBECK
FRANK F. REYNOLDS. JR.
INVENTOR.

BY Bernard A. Reiter
ATTORNEY

GEOPHONE DEVICE

This invention relates to sound detectors which are adapted to transduce mechanical to electrical signals. More particularly, the invention pertains to seismometers and/or geophones such as may be used by the geophysical industry for detecting and measuring certain subsurface geophysical characteristics.

Numerous industries are intimately concerned with the earth and its subsurface characteristics. The petroleum and mining industries for example are most particularly interested in improved exploratory devices for obtaining data and information on subsurface formations, densities, and layering. Among the most prevalent methods for obtaining subsurface data and information is the reflection seismograph method in which sound signals such as explosions are generated at or near the earth's surface so that the sound signals may be directed downwardly and reflected from subsurface formations in order to determine depth of the formations and other such information. The general details of reflection seismograph practice and the tools and devices used in conjunction therewith are well-known among those versed in the geophysical industry.

The modus operandi of reflection seismography includes and deals with energy propagated in the form of waves. Such wave propagation may be said to be characterized by velocity, frequency, intensity, direction and certain associated or derived characteristics and phenomenon, such as travel time, wave length, absorption, refraction, reflection and the like. Although all of these energy characteristics are available for measurement, comparatively little quantitative use is made of them in seismic analysis. The chief objective is to determine the distance between the earth's surface and one or more refracting and/or reflecting layers below. Therefore, virtually all interpretations in seismic work is based on travel time of the propagated sound wave. In order to determine the travel times of the waves sensitive detection devices known as mechanical seismographs or geophones are used to record the arrival times of first (refraction) or later (refraction and reflection) impulses. In principle, a mechanical seismograph consists of a mass suspended by a spring. As pointed out hereafter the mass suspension system is of fundamental importance in establishing the frequency characteristics of the device. The mass may also be associated with inductive, capacitive, or reluctance transducer. It then constitutes a mechanical seismograph with an electrical output system, otherwise known as a geophone. Whatever the arrangement for mechanical magnification or electrical transmission, the characteristics of a seismograph are determined in the main by its mechanical design.

Because of the substantial activity in geophysical exploration and development which has occurred in the past, much of the earth's shallow mineral and petroleum deposits have heretofore been exhausted or substantially depleted. As a result it is now necessary in the course of geophysical exploration to seek out and measure deeper subsurface formations than was necessary before. In this regard it is commonly known that in the propagation of sound waves through the earth the higher frequency waves are attenuated more than low frequency waves in relationship to the distance traveled. Thus, in order to effectively analyze subsurface formations and characteristics at increasingly deeper levels, geophones which can accurately and dependably respond to low frequency sound waves must be developed.

It is thus a principle object of the present invention to provide an improved geophone for use in geophysical exploration.

It is further an object of the present invention to provide an improved geophone having low frequency characteristics.

It is another object and feature of the invention to provide a geophone having an improved coil supporting spring structure characterized by a reliable, linear low frequency response ability.

Another object and feature of the invention is the provision for rugged mounting and clamping arrangements for the spring suspensions so as to prevent change in dynamic characteristics with use and age. Yet another object and feature of the invention resides in a spring supported structure providing for improved spring life regardless of the care taken in field use.

Still another object and feature of the invention resides in the high impact plastic case housing the improved geophone disclosed herein and which also provides for reduced cost, weight, and virtually eliminates electrical faulting to ground.

Another primary feature of the invention resides in the improved means for attaching the electrical cables to the device.

These and numerous other features and advantages of the invention will become readily apparent upon a reading of the following detailed description, claims and drawings thereof, wherein like numerals denote like parts in the several views and wherein:

Figure 4:
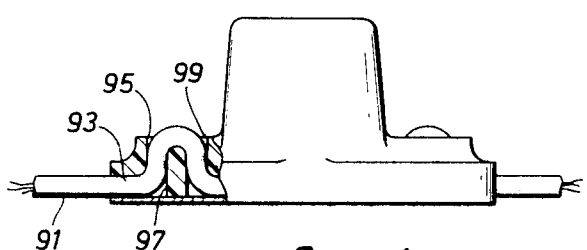

FIG. 4 s an exterior elevation view of the geophone showing, in partial cutaway, the snubbing arrangement for the leads.

As described above, a geophone is an electromechanical transducing device which receives mechanical vibrations from the earth or surface on which it is resting and delivers an electrical signal that duplicates the character of the mechanical vibrations. If the electrical signal differs or is not faithful in any way from the character of the impinging mechanical vibrations the signal is of course distorted and untrue. In order to obtain electrical output from a mechanical input there must be a generating device of some form which is coupled to the relative motion between components parts of the geophone. This is accomplished in elementary manner by use of a coil arranged to move in a magnetic field. By fastening the field structure fixedly to the frame or housing of the geophone and mounting the coil in movable manner on springs within the housing such that the coil lies within the magnetic field, motion of the coil with respect to the housing will produce an electrical signal by conventional generator action. Such basic phenomenon is the essence of operation of the subject device.

Figure 1:
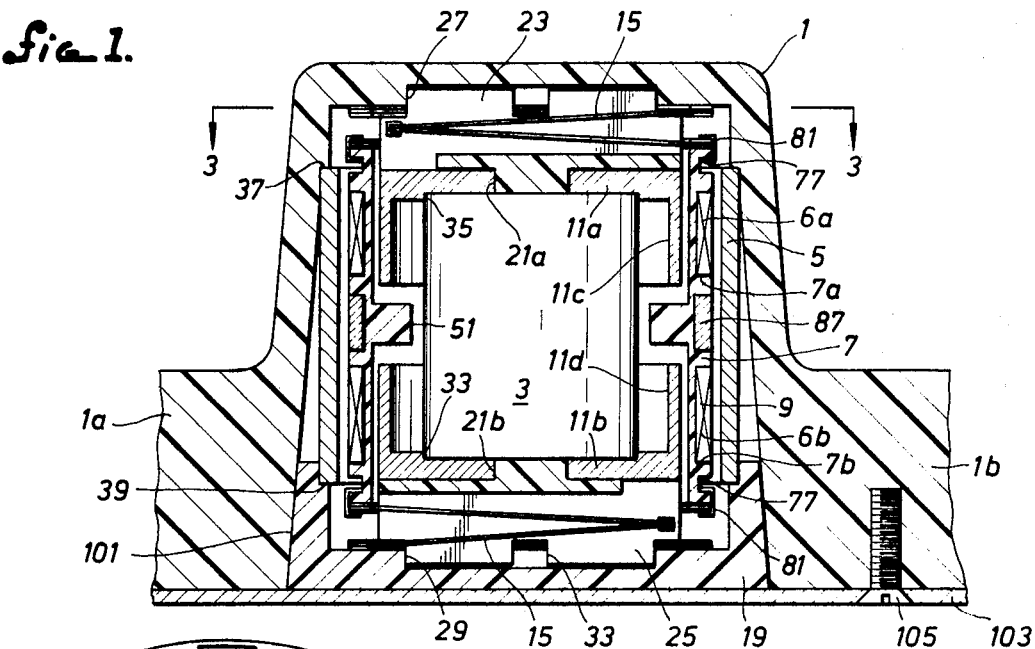
FIG. 1 is an elevation cross-sectional view through the improved geophone of the invention.

With reference now to FIG. 1 there is shown the housing 1 which may be molded of high impact plastic or other appropriate material. The housing is characterized by a tapered cylindrical head portion (FIG. 1) and two diametrically opposed wings 1a, 1b that incorporate the cables and anchoring connections described hereinafter. The central cylindrical portion of the housing is integrally closed at the top and adapted to be closed at the bottom by a separate circular plastic cap 19. A bottom closure plate 103, also described hereinafter, is adapted to enclose the entire bottom portion of the device.

In accordance with the theory of operation described above, the magnetic field of the invention is created by the centrally disposed cylindrical magnet 3 which is supported within the housing 1 by upper and lower cup-shaped iron pole pieces 11a, 11b. Each of the pole pieces is characterized by a centrally disposed axial bore through which is inserted the cylindrical projections 21a, 21b of the upper and lower pilot spacers 23, 25 respectively. Each of the upper and lower pilot spacers 23, 25 is characterized by a cylindrical shape in which there resides a recessed shoulder 27, 29 respectively for engaging correspondingly shaped shoulders in the upper portion of the housing 1 and in the cap 19. Both the upper portion of the housing 1 and the cap 19 are also characterized by diametrically oriented projections 31, 33 which are adapted to fit into mating recesses in each the upper and lower pilot spacers 23, 25 respectively so as to fixedly locate them with respect to the housing. It may thus be visualized that there exists in the center of the geophone a solidly fixed buildup of components consisting of the housing upper portion, the upper pilot spacer 23 mechanically engaged thereby, the upper iron pole piece 11a which engages and is located by the cylindrical projection 21a of the upper pilot spacer and the magnet 3 which is clampingly engaged at its lower end by a series of components identical in both structure and arrangement to those which engage the upper end. The stable and rugged characteristics of design are predominantly exhibited by the series of mechanically locking shoulders, projections and recesses which effectively align and prevent movement of the pilot spacers and pole pieces with respect to the housing. Constrained mounting of the magnet is effectuated within the housing by the shallow counterbores 33, 35 in each the lower and upper pole pieces and into which the magnet is loosely fitted. By virtue of this arrangement the pole pieces and pilot spacers are held precisely concentric with respect to the outer magnetic ring 5. The outer magnetic ring 5, which constitutes a portion of the magnetic field generating structure that includes the magnet 3 and iron pole pieces 11a, 11b, is mounted in recessed portions in each the housing and cap 19. The upper portion of the magnetic ring 5 is adapted to fit within molded recess 37 of the housing while the lower portion of the ring is adapted to fit within molded recess 39 of the cap 19. In this manner the ring 5 is retained in precise alignment radially as well as axially with respect to the magnet 3, thereby insuring a uniform magnetic gap between the two iron pieces. It may thus be visualized that the flux is adapted to flow out of the upper end of magnet 3 into the base portion of pole piece 11a down into the skirt section 11c and across the air gap to outer iron ring 5 and back to the skirt 11d of the pole piece 11b and subsequently into magnet 3 at the bottom or lower end thereof. This configuration of the magnetic path provides radial magnetic fields which are normal to the direction of the moving coils. The fundamental requirements for electrical generation are thereby satisfied.

Resiliently mounted on upper and lower springs 15 within the air gap defined by outer ring 5 and the pole piece skirts 11c is the coil carrying bobbin 7. The bobbin, which is of cylindrical hollow configuration, is characterized by an upper and a lower circumferential recess 7a, 7b, respectively. Each of the recesses 7a, 7b are adapted to receive a wound coil 6a, 6b therein. The recesses should be wound of course to a uniformly radial distance somewhat below the external surface of the bobbin.

Damping of the mechanism may occur in a number of ways. For example, if the coil form bobbin 7 is made of metal such as aluminum or brass it will have eddy currents induced in it by motion of the bobbin within the magnetic field. These currents oppose the motion and dissipate energy so as to produce damping. Damping may also result when a load is connected to the coils 6. Current flowing through the coils and out to the load opposes the motion of the mass structure and dissipates energy in the circuit. This is a preferred form of damping since the degree of damping can be readily adjusted by change of the load resistor.

The internal surface of the cylindrical bobbin 7 is characterized by an inwardly protruding, annularly formed bobbin stop 51, the purpose of which is to preclude strain or permanent distortion of the cantilever springs 15 due to dropping or rough handling of the geophone. This is accomplished by restricting movement of the bobbin in the vertical plane between the vertical limits defined by the lower end of skirt 11c of upper pole piece 11a and the upper end of skirt 11d of pole piece 11b.

Figure 2:
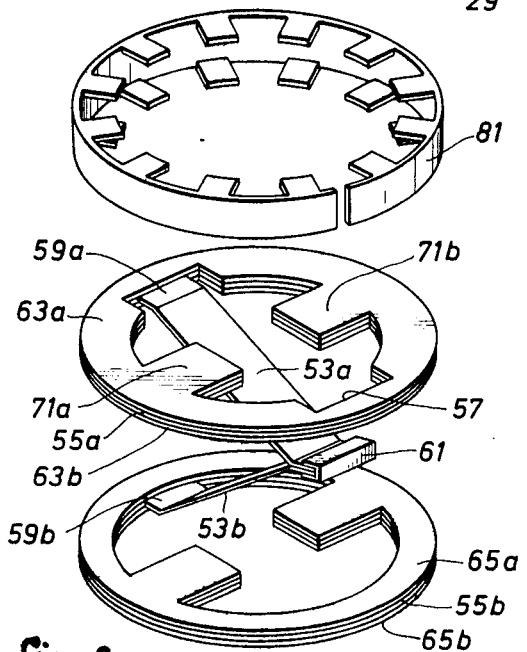
FIG. 2 is a three-dimensional view of one of the cantilever type support springs utilized in the geophone of FIG. 1.

With reference now to FIG. 2 there is shown in exemplary form the construction of one of the mass supporting spring assemblies of the invention. It will be recognized that there are two such assemblies, one supporting the bottom of the mass (bobbin 7) and fixedly attached thereto and to the cap member 19 and an upper spring which hereinafter may be referred to as a hanger spring which is fixedly connected to the upper portion of bobbin 7 and also to the top of housing 1 in a manner described hereinafter. It should be pointed out initially that the spring assembly of FIG. 2 typifies the lower assembly of FIG. 1, that is the unit which is fixedly attached to cap 19. The difference between the two spring assemblies lies solely in the inherently prestressed nature of their flexure elements 53a, 53b.

Referring to FIG. 2, a spring assembly is comprised of two cantilever mounted active spring members or flexure elements 53a, 53b having one end integral with annular elements 55a, 55b respectively and four fairly rigid clamping plates 63a, 63b, 65a, 65b, which accurately control the zone in which bending of the flexure elements occurs. The clamping plates 63a, 63b confine annular spring element 55a in a sandwich arrangement fixedly assembled with rivets, welding or other suitable means. Clamping plates 65a, 65b and annular spring element 55b are similarly assembled. Spring flexure elements 53a, 53b are formed by bending at two or more points in each element as is indicated at 59a, 59b and 60a, 60b, such that the extreme ends of each element are offset in different planes but are parallel. The free ends of the cantilever flexure elements 53a, 53b are fixedly connected to one another by rivets, welding and/or clamp as shown at 61 to create the folded-back flexure system shown in FIG. 2. In the complete unstressed assembly the two rigid annular sections are parallel to each other and are physically separated by an amount determined by the initial bending of the spring flexure elements 53a, 53b.

It should be noted that the spring assembly shown in FIG. 2 is specifically the form required for the lower unit assembly 15 in FIG. 1 where a compression action may be used to "support" the static weight of the moving system. In this (lower) assembly the flexure elements or arms 53(a)(b) are bent towards one another at 59a59b and clamped as at 61 in a "face-to-face" manner. (By contrast the upper assembly is constructed by simply moving the upper portion of the assembly (55a; 63a, b; and 53a) beneath the lower portion (55b; 65a, b; 53b) biasing the arms 53a, 53b, toward one another and clamping them as at 61. Thus as the spring assembly is stressed by application of load, it (lower assembly) compresses but the rigid annular sections remain parallel and the spring reaction increases until it tends to support more of the suspended mass when the specified clearance exists between the annular elements. Similarly the upper assembly expands and tends to "carry" the load. Each flexure element 53a, 53b flexes under load to a "S" shape which is characteristic of a double clamped cantilever beam. It will be recognized that the deflection distance of each arm is additive so as to produce in each spring assembly the sum of the deflection in the arms thereof. The "S" shape of flexure is superimposed on the initial normal shape produced by bending to yield a resultant stressed shape of the flexure element that is more or less straight but with minor irregularities, the preferred condition for these elements.

As explained briefly above, the spring assembly 15 for the upper or top location (FIG. 1) is comprised of the same basic elements but is different in three distinct details. This assembly has the characteristics of a tension spring and therefore "carries" a load; it has a different degree of initial bending of the flexure elements (53a, 53b) to meet the static load requirement at specified deflection, and the free ends of the flexure elements are joined to each other back-to-back as compared with the lower, compression spring assembly which are joined face-to-face. In this upper spring assembly the two rigid annular subassemblies are placed together flatly and concentrically and with the flexure elements in line with each other but projecting outwards on opposite sides away from one another. The free ends of the flexure elements are then forced together at the neutral plane between the two annular sections and are fixedly attached to each other with rivets, etc., as in the lower assembly. It is evident that this produces a tension (tending to hold the annular sections together) of a magnitude determined by the initial offset of the flexure elements produced by bending of them. As the rigid annular sections are pulled apart the deflections of the flexure elements increases beyond the original assembly conditions and the tensions exerted builds up to the desired value for static lift when the specified separations of annular sections is obtained. It will therefore be readily recognized that when the upper spring is mounted on the housing 1 and connected to the bobbin 7, its inherent resilient characteristics will be to lift the bobbin upwardly. Conversly, it will similarly be recognized that the inherent resilient characteristics of the lower spring, when attached to the lower portion of bobbin 7 and fixedly supported within cap 19, will be to push the bobbin upwardly. In this manner both the upper and lower spring assemblies are adapted not only to equally contribute to the force necessary to suspend the bobbin 7 appropriately within the air gap defined by the skirts of pole pieces 11a, 11b, and the outer iron ring 5, but also, due to their aforedescribed construction only linear movement of the bobbin can occur, i.e., no rotational and substantially no sidewise movements can result.

Figure 3:
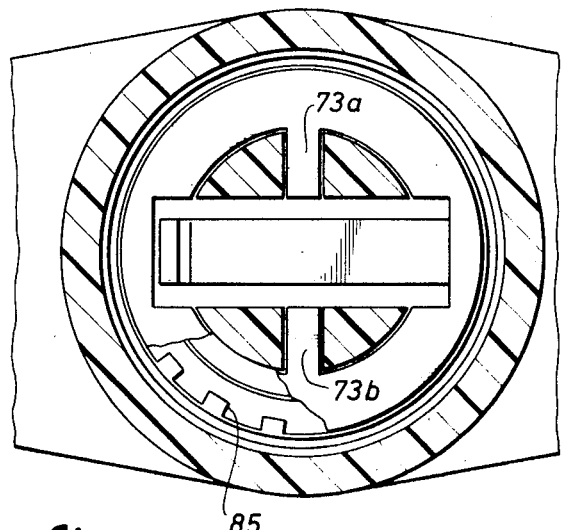
FIG. 3 is a sectional view of the device of FIG. 1 along the plane 3–3 thereof.

Each of the spring assemblies are affixed at their respective inner ends to a flanged section 77 of the bobbin 7. This attachment is accomplished with a conventional ring clamp 81 of channel cross section. The legs of the channel are directed towards the center of the geophone with one leg overlapping the ring of the spring and the corresponding leg engaging the recessed flange 77 at each the upper and lower circumferences of the bobbin. With this arrangement the spring assembly is firmly clamped to the end of the bobbin or coil form around its perimeter. The channel clamping ring may be secured against displacement after assembly by soldering or cementing. The channel ring may be a complete channel or it may have discrete tabs for legs 85 (see FIG. 3) thus giving the effect of a number of miniature C-clamps held together by a band.

In view of the bobbin and coil support structure as exemplified by the aforementioned spring assembly description, it will be recognized that the suspended coil assembly causes the upper spring to be normally extended or in tension and the lower spring to be normally compressed. It is inherent in this arrangement that the flexure elements cannot be in one plane and cannot in any circumstance be normal to the geophone axis when the device is assembled, that is, they are always at a deflection angle. This proves to be of significant advantage for the following reason.

It is well known that the deflection of a cantilever spring is not exactly proportional to the force applied. As the deflection increases, the force required per unit deflection also increases; the curve of deflection plotted against force is generally concave downwards. In the ideal suspension for a distortionless geophone the deflection-force diagram would be a perfectly straight line. The structure of the present invention gives a combined deflection-force curve that closely approximates a straight line over the operating range of travel. The reason for this is that the movement of the coil from a generally central position is characterized by one spring being deflected more and therefore becoming slightly stiffer while the other spring undergoes reduced deflection and becomes slightly softer. The combined cooperative effect is for the total spring stiffness to remain nearly constant as may be confirmed by analytical evaluation as well as by physical tests.

Supplemental mass 87 may be added as necessary in the annular space provided at the outer center of the coil bobbin. Such supplemental mass is used to correct for minor variations in mass of the bobbin and its windings such that a uniform value of total mass is obtained to help maintain identical mechanical frequency between units in production.

Connection of the electrical leads to the moving coil assembly is accomplished through the two spring supports, each serving for one connection. The utilization of insulating material for the bobbin and nonmetallic materials for the housing and pilot spacers insure complete electrical isolation of both ends of the springs, thus making them available as signal conductors. Thus there is eliminated the need for supplementary, flexible leads to the coils which leads are normally very fragile and subject to early failure.

Cap 19 serves to complete the enclosure of all active parts and supports the central magnet assembly as well as providing clamping and alignment for the outer magnetic ring 5 at its lower end. Following assembly of all mechanical parts is the housing the cap is installed with proper orientation and is pressed securely into place to tightly confine the central build up of components. Solvent or cement is used around the tapered fit between cap and housing to create a strong, permanent bond between the two. Electrical connections from the springs are brought out with insulated wire through channels cast in the housing and connect to terminals in a small cavity in one of the base wings. Casting cement is used to seal the wire channels and fully capture the wires. External cable connections are made to the terminals in the cavity in the base as described later.

Closing the bottom of the housing in covering relation to cap 19 is a bottom plate having a shape conforming to the configuration of the bottom of the housing and positioned over the cap and the housing and attached thereto by means of the recessed screws 105 which are adapted to engage complementary threaded apertures in the molded housing or separate nuts.

The field use of geophones is characterized by extremely rough handling and jerking of the lead cables. Frequently the cables are either jerked loose or damaged in some manner within the phone. Therefore, secure attachment to the geophone is of signal importance in order to insure continued and reliable use. For this reason strain relief at the point of attachment is particularly critical. In the present geophone the cable 91 enters through a horizontally oriented tunnel shaped passage 93 in each of the wings 1a, 1b, see FIG. 4. The cable is then threaded upwardly a short distance through a round hole 95 which is an extension of the tunnel into the vertical direction. The diameter of the hole is very close to that of the cable itself. The cable is then threaded over a saddle shaped barrier or wall 97 and back down through a second close fitting hole 99 on the opposite side thereof and hence into the housing where attachment is made to terminals. Similar cable is typically threaded into the other side of the housing (see FIG. 4) and attached to terminals to complete the external electrical connections. It may thus be seen that passage of the cable around one 90° arc plus a second 180° arc provides for a snubbing action which effectively precludes slippage or more particularly transmission of cable pull to the small terminal connections. There is no need for any clamping action in any of the three passages occupied by the cable. This arrangement is advantageous in that no special tools or fitting are required to install the cable and any field repairs can readily be made. It will similarly be recognized that the passageways may be oriented in a lateral manner off the housing wing 1a, 1b, in order to reduce the overall length of the geophone or may be oriented horizontally to reduce the height of the wings.

It is to be understood that the form of the invention herewith shown and described is to be taken as a preferred example or embodiment of the same and that various changes in the shape, size and arrangement of the parts may be resorted to without departing from the spirit of the invention or from the scope of the subjoined claims.

Therefore, what I claim and desire to be secured by Letters Patent is:

1. In an electromechanical transducer for receiving mechanical vibrations and delivering them as an electrical signal comprising:
    a housing having means therein for creating a reference field,
    signal producing means resiliently carried by said housing on cantilever mounted spring means and adapted to reciprocally move in an irrotational manner in the reference field, and,
    electrical cable means operatively connected in the housing so that movement of the signal producing means with respect to the reference field causes transmission of an electrical signal therethrough to a recording system, said cantilever mounted spring means comprising an upper spring assembly engaging said signal producing means for carrying a portion of the weight thereof, and, a lower spring assembly engaging the signal producing means for supporting the remainder of the weight thereof, each of said spring assemblies including two double-clamped cantilever arms mounted such that the deflection imparted to each arm is additive.

2. The structure of claim 1 wherein said cantilever mounted spring means comprises an upper spring assembly engaging said signal producing means for carrying a portion of the weight thereof and a lower spring assembly engaging the signal producing means for supporting the remainder of the weight thereof, each of said spring assembly means including first and second cantilever mounted arms, said second arms being affixed to the free end of its respective first arm, the free end of the second arm being directed towards the supported end of its respective first arm to thereby form a fold back relationship between said arms, the free end of each said second arm being affixed to said signal producing means so as to thereby form two double clamped cantilever arms arranged in series such that the deflections of the arms in each assembly are additive.

3. The structure of claim 2 wherein the physical size and deflection characteristics of each said arms are substantially identical so that movement of said signal producing means is linear and reciprocal.

4. The structure of claim 2 wherein each said arms include discrete bend means proximate each end thereof, the angle of each said bend means being such that the clamped ends of each arm are parallel but offset with respect to the plane of the other so as to thereby impart to the spring means a predetermined position under static load.

5. The structure of claim 4 wherein the offset ends of each of said double clamped cantilever mounted arms in said lower spring assembly are arranged in diverging configuration with respect to each other when in the unloaded state so as to thereby function as a compression spring when loaded.

6. The structure of claim 4 wherein the offset ends of each of said double clamped cantilever mounted arms in said upper spring assembly are arranged in converging configuration with respect to each other when in the unloaded state so as to thereby function as a tension spring when loaded.

7. The transducer of claim 1 wherein said means for producing a reference field is characterized by a recessed shelf and said resiliently supported signal producing means includes an inwardly directed radial shoulder which is adapted to fit within said recessed shelf while providing a predetermined clearance therebetween to thus prevent excessive longitudinal movement of the resiliently supported signal producing means.

8. The transducer of claim 1 wherein said housing includes a cable entry means designed to provide a snubbing type engagement of said cables to said housing in order to prevent the transmission of cable strain to the point of electrical connection in the housing.

9. The transducer of claim 1 wherein said signal producing means includes adjustment means therein for varying its mass in order to effectuate a change in the frequency response.